United States Patent [19]
Alexander

[11] Patent Number: 5,926,890
[45] Date of Patent: Jul. 27, 1999

[54] DOCK LEVELER LIP CONSTRUCTION

[75] Inventor: James C. Alexander, London, Canada

[73] Assignee: United Dominion Industries, Inc., Charlotte, N.C.

[21] Appl. No.: 08/735,337

[22] Filed: Oct. 22, 1996

[51] Int. Cl.⁶ ................................................ E01D 1/00
[52] U.S. Cl. ................................................ 14/71.1
[58] Field of Search .................... 14/69.5, 71.1, 14/71.3, 71.5, 71.7

[56] References Cited

U.S. PATENT DOCUMENTS

| | | | |
|---|---|---|---|
| 4,450,598 | 5/1984 | Larsen | 14/71.1 |
| 4,570,277 | 2/1986 | Hahn et al. | 14/71.1 X |
| 4,823,421 | 4/1989 | Kleynjans et al. | 14/71.3 |
| 4,935,979 | 6/1990 | Walker et al. | 14/71.1 |
| 5,042,103 | 8/1991 | Megens | 14/71.7 |
| 5,123,135 | 6/1992 | Cook et al. | 14/71.3 |
| 5,157,801 | 10/1992 | Alexander | 14/71.3 |
| 5,214,818 | 6/1993 | Cook | 14/71.1 |

*Primary Examiner*—James A. Lisehora
*Attorney, Agent, or Firm*—Sughrue, Mion, Zinn, Macpeak & Seas, PLLC

[57] ABSTRACT

A dock leveler having a frame, a deck hingedly mounted at on end to the frame and a lip hingedly mounted to the deck at another thereof. The lip has a hinge tube affixed to the lip and a gusset joined to both the lip and the hinge tube. The gusset has an end joining the lip having a width greater than an end joining the hinge tube. The gusset may have a trapezoidal shape and the end of the gusset joining the lip is affixed by two welds each spanning the width of the end joining the hinge tube and disposed between the gusset and the hinge tube. The two welds are joined to each other by extending around edges of the gusset. A single gusset may span the lip and be joined to multiple hinge tubes.

8 Claims, 3 Drawing Sheets

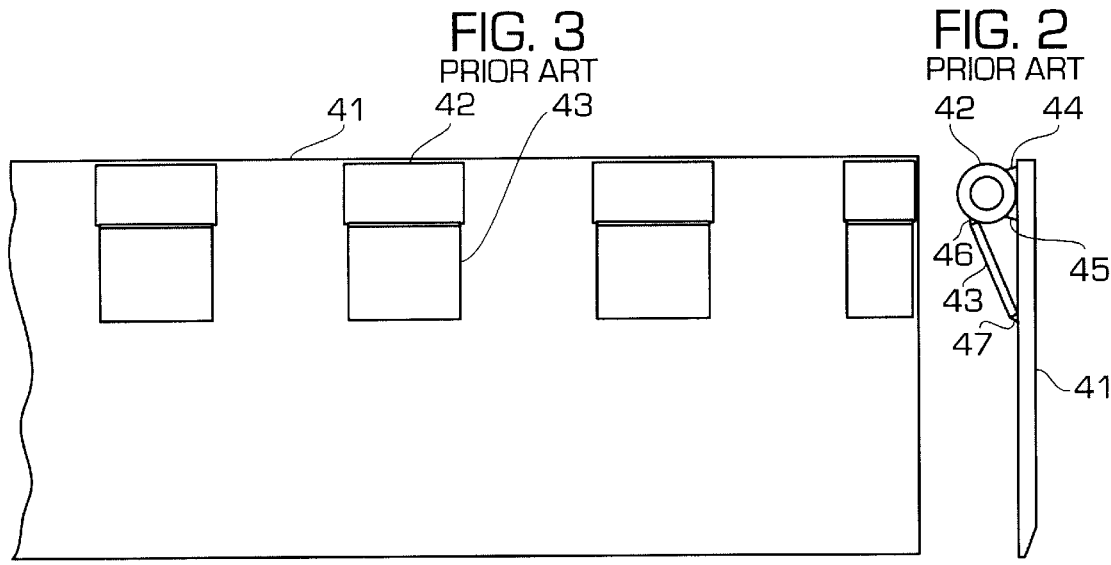
FIG. 3
PRIOR ART
FIG. 2
PRIOR ART
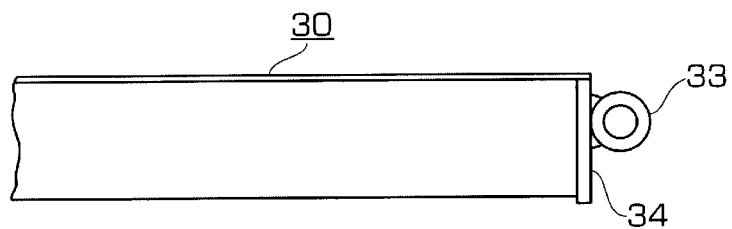
FIG. 4
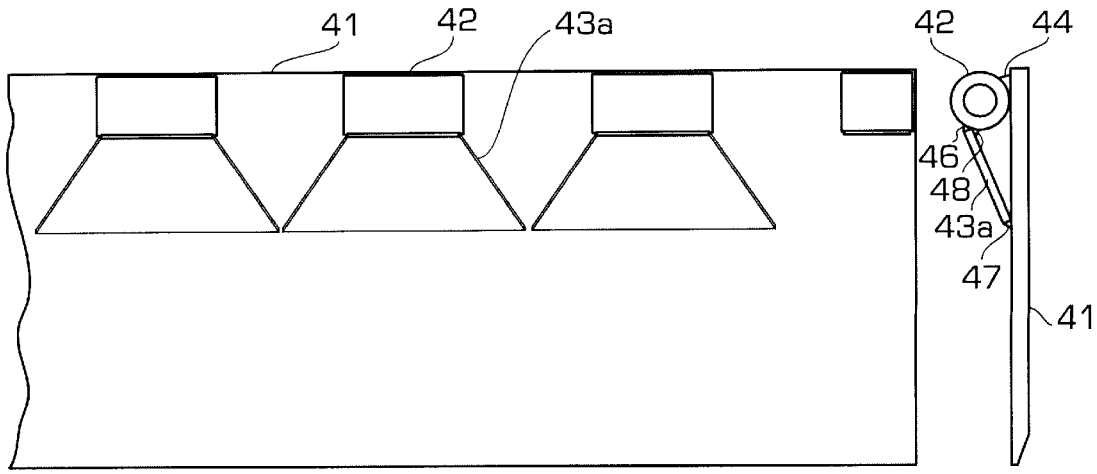
FIG. 6
PRIOR ART
FIG. 5
PRIOR ART

DOCK LEVELER LIP CONSTRUCTION

BACKGROUND OF THE INVENTION

1. Field of the Invention

This invention relates to loading dock equipment and in particular to dock levelers which are used to span the distance between a loading dock and the bed of a vehicle. Specifically, it deals with increasing the strength and resistance to fatigue failure of the lip assembly.

2. Prior Art

A conventional dock leveler has a deck assembly which stores level with the dock floor or vertically, and a pivoting lip assembly which extends outward to rest on the vehicle which is being loaded. The deck assembly can be of various structural configurations with structural beam members to provide strength and rigidity to the top plate. However the lip assembly must be of a much thinner section to minimize the height difference between the top of the deck assembly and the bed of the transport vehicle. Also, the lip must hinge downward approximately 90 degrees to store the dock leveler or to allow the lip to be removed from the vehicle for end loading the last pallets at the end of the vehicle. These constraints have traditionally caused the lip assembly and hinge to be the weakest parts of the dock leveler structure.

SUMMARY OF THE INVENTION

This invention is a new type of lip assembly and method of construction which significantly increases the strength and resistance to fatigue failure of the lip assembly of a dock leveler. In accordance with this invention a dock leveler has a frame, a deck hingedly mounted at on end to the frame and a lip hingedly mounted to the deck at another thereof. The lip has a hinge tube affixed to the lip and a gusset joined to both the lip and the hinge tube. The gusset has an end joining the lip having a width greater than an end joining the hinge tube. The gusset may have a trapezoidal shape and the end of the gusset joining the lip is affixed by two welds each spanning the width of the end joining the hinge tube and disposed between the gusset and the hinge tube. The two welds are joined to each other by extending around edges of the gusset. A single gusset may span the lip and be joined to multiple hinge tubes.

The tapered shape of the gusset plate and the manner of assembly provides a greater length of weld to distribute the loads and reduce the number of ends of the weld where crack propagation may begin.

This invention will be described in greater detail by reference to the drawing and the description of the preferred embodiment which follows.

BRIEF DESCRIPTION OF THE DRAWING

FIG. 2 is a side view of a typical lip assembly, illustrating the hinge tube and gusset configuration;

FIG. 3 is a bottom view of a typical lip assembly, illustrating the hinge tube and gusset configuration;

FIG. 4 is a side view of a typical deck assembly illustrating the and hinge tube configuration;

FIG. 5 is a side view of the first preferred embodiment of the lip assembly, hinge tube and gusset configuration of this invention;

FIG. 6 is a bottom view of the first preferred embodiment of the lip assembly, hinge tube and gusset configuration of this invention.

DESCRIPTION OF PREFERRED EMBODIMENTS

Figure 1:
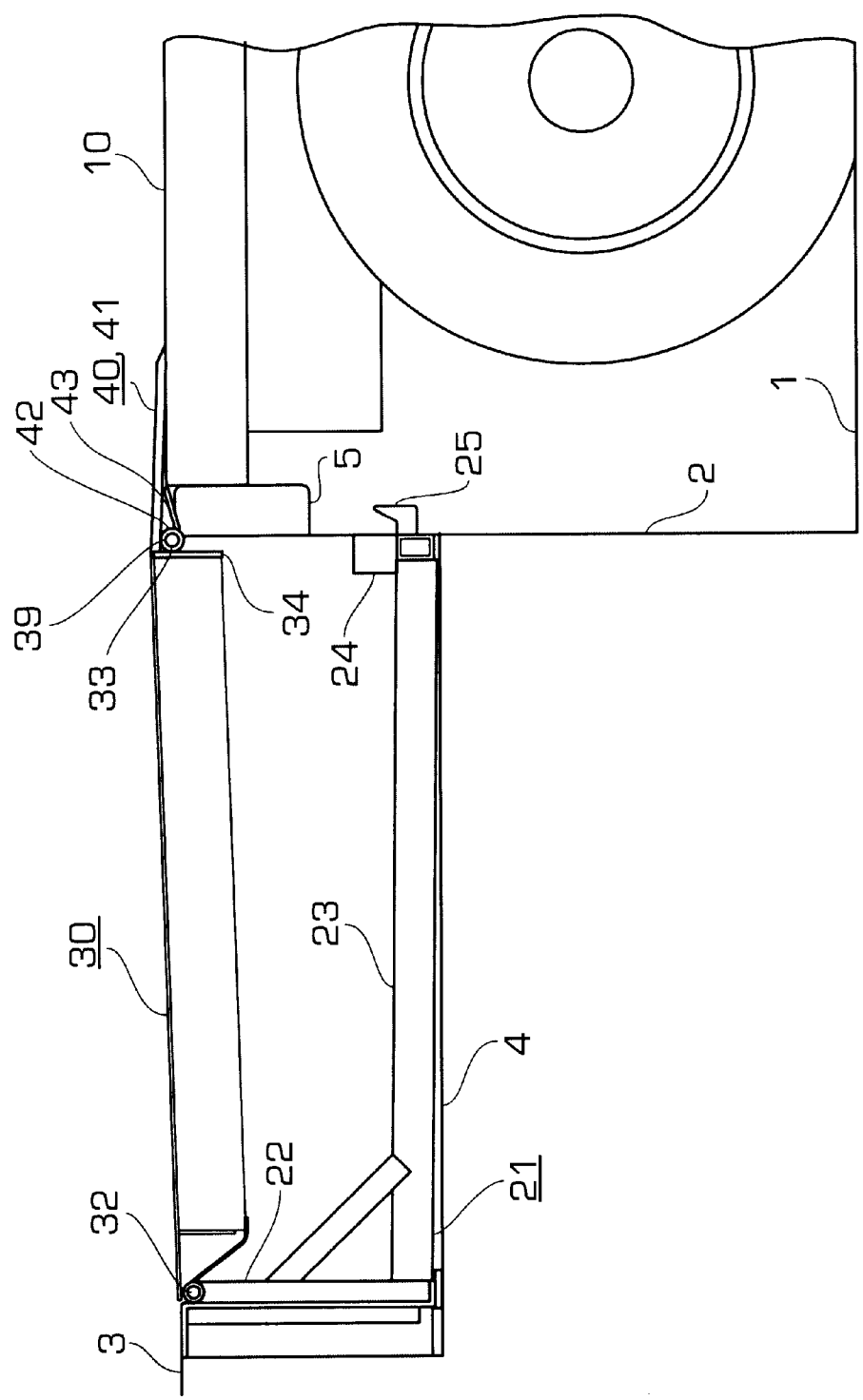
FIG. 1 is a side view of a typical dock leveler with the lip extended on to a vehicle.

Referring now to FIG. 1 a side view of a typical loading dock is illustrated. The dock has a driveway surface 1, a dock face 2 and a dock floor 3. A pit 4 is formed in the dock floor. Dock bumpers 5 limit the position of the transport vehicle 10. A dock leveler 20 has a frame assembly 21 attached to the pit. The frame assembly has vertical back frame members 22 with the hinge pivot holes near the top. Horizontal frame members 23 extend forward to the front of the pit 4 and have ramp stops 24 and lip keepers 25 which support the dock leveler in the stored position. A deck assembly 30 has rear hinge supports 31 which are attached to the frame assembly 21 by a deck hinge pin 32.

Lip hinge tubes 33 are fastened to the front bar 34 of the deck assembly 30. A lip assembly 40 has a lip plate 41, hinge tubes 42 and hinge tube gussets 43, and is connected to the deck hinge tubes by a lip hinge pin 39. The front end of the lip assembly 40 rests on the bed of a transport vehicle 10 during loading and unloading operations.

Any load on the dock leveler is transferred to the frame assembly 20 through the deck hinge pin 32 and to the bed of the vehicle 10 through the front end of the lip 41. Because the distance from the deck hinge pin 32 to the front end of the lip is much greater than the distance from the deck hinge pin 32 to the rear of the lip, the leverage will generate forces on the lip hinge pin 39 and hinge tubes 42 which may be 10 to 15 times as great as the force applied upward at the front end of the lip 41 resting on the bed of the vehicle 10.

FIGS. 2 and 3 show the construction of a conventional lip assembly with a lip plate 41, a number of hinge tubes 42 which fit between a number of similar hinge tubes 33 welded the front header 34 of the deck assembly 20 shown in FIG. 4. The typical method of construction of the lip assembly is to weld the hinge tubes 42 to the lip plate 41 with the welds and 44 and 45. The gussets 43 may then be optionally added to reduce the bending stress in the lip 41 and are attached using the welds 46 and 47. While this construction is adequate for many dock leveler applications, it is prone to fatigue failure at the welded joints when subjected to repeated high loads. Typically failure will occur at the welds and often begins at the ends of the welds where stress is increased by the abrupt change in thickness.

FIGS. 5 and 6 illustrate the construction of the improved lip assembly in accordance with a first preferred embodiment of this invention. Each gusset 43a is outwardly tapered as shown and is welded to the hinge tube 42 on two surfaces by the welds 46 and 48. This method of construction allows the total length of weld between the gusset 43a and hinge tube 42 to be twice that of the conventional construction shown in FIG. 2.

Preferably the welds 46 and 48 are joined by being extended around both sides of the gusset so that there is no discontinuity of the weld where a crack may begin to propagate. The gusset 43a must be welded to the hinge tube 42 by the weld 48 before both are welded to the lip plate 41.

The other end of the gusset 43a is wider than the hinge tube 42. The outward tapering of the gusset provides a greater length for the weld 47 to balance the combined length of the welds 46 and 48 at the hinge tube, and also provides less rigidity at the ends of the welds to reduce stresses and the probability of weld fatigue failure. Preferably the end of the gusset is wide enough to minimize the space between adjacent gussets so that the welds 47 between the gussets 43a and the lip plate 41 can be continuous. That is, the weld between the lip 41 and the gussets can be a continuous bead.

The hinge tube 42 is welded to the lip plate 41 only by the weld 44. However the strength of this weld is sufficient because the forces, at the rear of the lip plate 41 are primarily compressive and supported by the front of the deck assembly 30.

Figure 7:
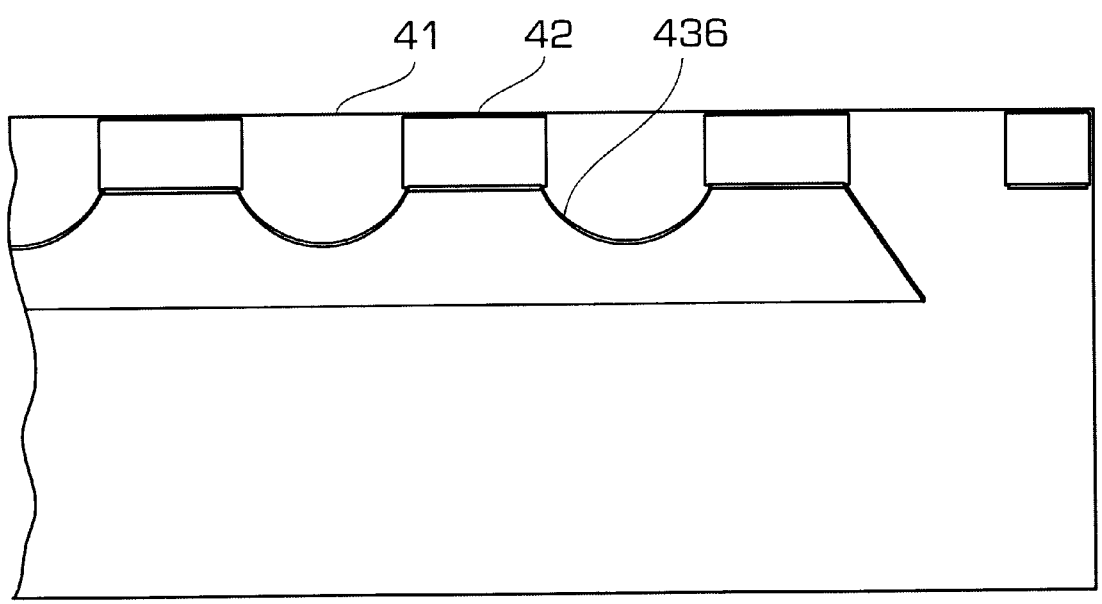
FIG. 7 is a bottom view of the second preferred embodiment of the lip assembly, hinge tube and gusset configuration of this invention.

FIG. 7 illustrates a second preferred embodiment with a single large gusset plate 43b which provides similar structural improvement and eliminates the joint between gussets. This continuous gusset may be affixed to the hinge tubes in a manner illustrated in FIG. 5. This single gusset spans the substantial width (at least 50%) of the lip except for the ends where shorter hinge tubes are present. Preferably, as illustrated, a gusset is not used on the shorter hinge tubes at each side of the lip plate for the purpose of reducing the rigidity at the sides and reduce the probability of a crack propagating from the edges of the plate.

It apparent that modifications of this invention may be practiced without departing from this invention. For example, while two different geometries of the gusset are illustrated other shapes may be employed.

I claim:

1. A dock leveler comprising:
a frame, a deck hingedly mounted at one end to said frame, a lip hingedly mounted to said deck at another end thereof, said lip having a first hinge tube affixed to said lip and a first gusset joined to both said lip and said first hinge tube, wherein said first gusset has an end joining said lip having a width greater than a width of an end joining said first hinge tube; a second hinge tube and a second gusset joined to both said second hinge tube and said lip, wherein ends of said first and second gussets joined to said lip extend in a line with substantially no distance therebetween and a continuous weld joining said first and second gussets to said lip.

2. The dock leveler of claim 1 wherein said gusset has a trapezoidal shape.

3. The dock leveler of claim 1 wherein said ends of said first and second gussets joined to said first and second hinge tubes are affixed by two welds each spanning the width of said end joining a respective hinge tube and disposed between said gusset and said hinge tube.

4. The dock leveler of claim 3 wherein said two welds are joined to each other by extending around edges of said gusset.

5. The dock leveler of claim 1 further comprising a second hinge tube, wherein said gusset is joined to said second hinge tube.

6. The dock leveler of claim 5 wherein said gusset is cutaway between said hinge tubes.

7. The dock leveler of claim 5, wherein said gusset spans greater than 50% of the width of said lip.

8. A dock leveler comprising: a frame, a deck hingedly mounted at one end to said frame, a lip hingedly mounted to said deck at another end thereof, said lip having a first hinge tube affixed to said lip and a first gusset joined to both said lip and said first hinge tube, wherein said first gusset has an end joining said first hinge tube that is affixed by two welds each spanning the width of said one end joining the first hinge tube and disposed between said first gusset and said first hinge tube, a second hinge tube and a second gusset joined to both said second hinge tube and said lip, wherein ends of said first and second gussets joined to said lip extend in a line with substantially no distance therebetween and a continuous weld joining said first and second gussets to said lip.

* * * * *